United States Patent
Pandian et al.

(10) Patent No.: US 12,332,633 B1
(45) Date of Patent: Jun. 17, 2025

(54) DYNAMIC OPTIMIZATION OF BOT SCHEDULES

(71) Applicant: NTT DATA Services, LLC, Plano, TX (US)

(72) Inventors: Aananthanarayanan Pandian, Chennai (IN); Jagadeesh Vummiti, Chennai (IN); Tanvir Khan, Allen, TX (US); Harsh Vinayak, Gurgaon (IN); Dhurai Ganesan, Chennai (IN)

(73) Assignee: NTT DATA Services, LLC, Plano, TX (US)

( * ) Notice: Subject to any disclaimer, the term of this patent is extended or adjusted under 35 U.S.C. 154(b) by 523 days.

(21) Appl. No.: 17/871,578

(22) Filed: Jul. 22, 2022

(51) Int. Cl.
*G05B 19/4155* (2006.01)
*G06F 9/50* (2006.01)

(52) U.S. Cl.
CPC ....... *G05B 19/4155* (2013.01); *G06F 9/5005* (2013.01); *G05B 2219/40113* (2013.01); *G06F 2209/5021* (2013.01); *G06F 2209/503* (2013.01)

(58) Field of Classification Search
None
See application file for complete search history.

(56) References Cited

U.S. PATENT DOCUMENTS

| 10,908,950 | B1 | 2/2021 | Dennis et al. | |
|---|---|---|---|---|
| 2019/0044829 | A1 | 2/2019 | Balzer et al. | |
| 2020/0306970 | A1 | 10/2020 | Latkar et al. | |
| 2020/0327175 | A1 | 10/2020 | Stephenson et al. | |
| 2020/0334078 | A1 | 10/2020 | Baldocchi et al. | |
| 2021/0146537 | A1* | 5/2021 | Bannoura | G06F 21/604 |
| 2021/0294644 | A1* | 9/2021 | Nott | G06F 9/4881 |
| 2021/0339389 | A1* | 11/2021 | Arcand | B25J 9/0084 |
| 2022/0269287 | A1* | 8/2022 | Chen | G05D 1/0291 |
| 2023/0195516 | A1* | 6/2023 | Saraf | G06F 9/4881 718/102 |
| 2023/0409304 | A1* | 12/2023 | Vemulapalli | G06F 8/60 |

* cited by examiner

*Primary Examiner* — Adam Lee
(74) *Attorney, Agent, or Firm* — Patterson + Sheridan, LLP

(57) ABSTRACT

In an embodiment, a method includes receiving input data for a transaction that is to be executed robotically, at least in part, via a plurality of bot runs. The method also includes generating a plurality of bot schedules for the plurality of bot runs based, at least in part, on the input data. The method also includes automatically determining priorities for the plurality of bot schedules based, at least in part, on the input data and business configurations. The method also includes assigning shared resources to the plurality of bot runs according to the plurality of bot schedules, where the assigning is at least partly based on resource availability and values of the automatically determined priorities relative to priority values for other bot schedules for other transactions.

20 Claims, 6 Drawing Sheets

DYNAMIC OPTIMIZATION OF BOT SCHEDULES

BACKGROUND

Technical Field

The present disclosure relates generally to robotic processes and more particularly, but not by way of limitation, to dynamic optimization of bot schedules.

History of Related Art

Task automation, while often desirable, is not always feasible. As more and more business processes become automated via robotic process automation (RPA), demand for robotic resources often exceeds resource availability. It is increasingly difficult to prioritize and manage RPA operations.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In an embodiment, one general aspect includes a method of dynamically optimizing bot schedules. The method includes receiving input data for a transaction that is to be executed robotically, at least in part, via a plurality of bot runs. The method also includes generating a plurality of bot schedules for the plurality of bot runs based, at least in part, on the input data. The method also includes automatically determining priorities for the plurality of bot schedules based, at least in part, on the input data and business configurations. The method also includes assigning shared resources to the plurality of bot runs according to the plurality of bot schedules, where the assigning is at least partly based on resource availability and values of the automatically determined priorities relative to priority values for other bot schedules for other transactions. Other embodiments of this aspect include corresponding computer systems, apparatus, and computer programs recorded on one or more computer storage devices, each configured to perform the actions of the methods.

In an embodiment, another general aspect includes a computer system. The computer system includes a processor and memory that, in combination, are operable to implement a method. The method includes receiving input data for a transaction that is to be executed robotically, at least in part, via a plurality of bot runs. The method also includes generating a plurality of bot schedules for the plurality of bot runs based, at least in part, on the input data. The method also includes automatically determining priorities for the plurality of bot schedules based, at least in part, on the input data and business configurations. The method also includes assigning shared resources to the plurality of bot runs according to the plurality of bot schedules, where the assigning is at least partly based on resource availability and values of the automatically determined priorities relative to priority values for other bot schedules for other transactions.

In an embodiment, another general aspect includes a computer-program product. The computer-program product includes a non-transitory computer-usable medium having computer-readable program code embodied therein. The computer-readable program code is adapted to be executed to implement a method. The method includes receiving input data for a transaction that is to be executed robotically, at least in part, via a plurality of bot runs. The method also includes generating a plurality of bot schedules for the plurality of bot runs based, at least in part, on the input data. The method also includes automatically determining priorities for the plurality of bot schedules based, at least in part, on the input data and business configurations. The method also includes assigning shared resources to the plurality of bot runs according to the plurality of bot schedules, where the assigning is at least partly based on resource availability and values of the automatically determined priorities relative to priority values for other bot schedules for other transactions.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
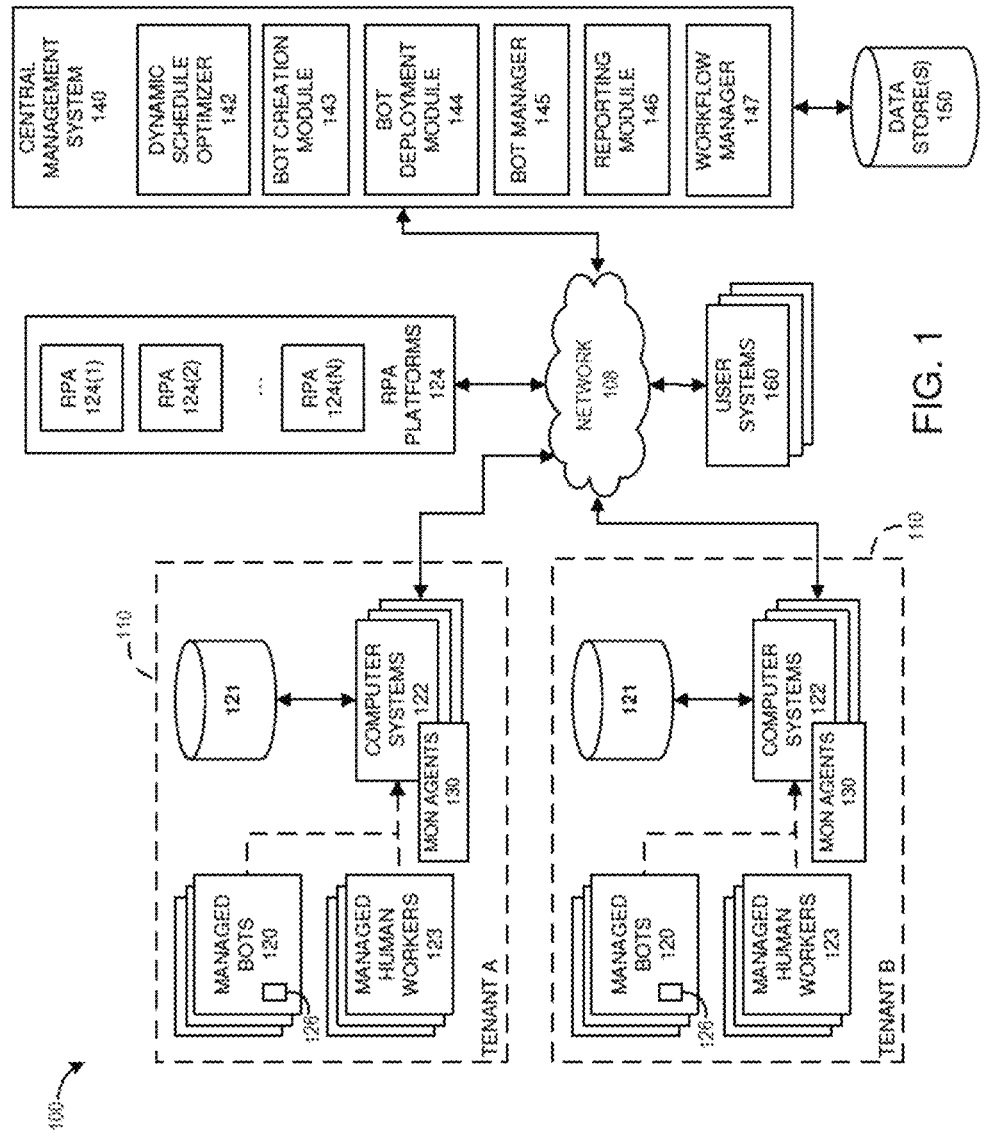
FIG. 1 illustrates an example of a system for implementing a central management system.

Robotic process automation (RPA) is the use of software, typically in combination with artificial intelligence (AI) and machine learning capabilities, to handle high-volume sequences of repeatable tasks that previously required humans to perform. These tasks can include interacting with a user interface (UI), for example, to perform queries, calculations, maintenance of records and transactions, web automations, remote operations, database functions, terminal connections, desktop operations, text operations, mouse simulations, keyboard simulations, folder operations, file handlers, clipboard handlers, combinations of the foregoing and/or the like. RPA technology can mimic a human worker, for example, by logging into applications, entering data, calculating and completing tasks, and logging out.

RPA technology is not always part of an organization's information technology (IT) infrastructure, but can instead, sit on top of it, enabling an organization to implement RPA technology quickly and efficiently, without changing the existing infrastructure and systems. In various embodiments, a computing environment can include, for example, many hundreds or thousands of software agents, often referred to herein as "bots," that automatically perform robotic processes. In various cases, the sequence of computer-implemented tasks performed by each bot can be the same or different, or a combination thereof. Oftentimes, the computing environment can further include, for example, many hundreds or thousands of human workers that likewise execute the same or similar computer-implemented tasks, or a combination thereof, via manual interaction with UIs. A set or sequence of computer-implemented tasks, such as the foregoing example tasks, may be referred to as a user-executed process.

Although bots can provide greater efficiency via increased automation, bots introduce numerous technical problems. For example, in the RPA world, managing and prioritizing bot operations is an increasingly difficult task as more processes are automated. Generally, bots are scheduled for performing RPA processes in many industries. In addition, some bots may be operated from a control room or command center without a schedule. Consider an example of processes being automated in the finance industry. Various scheduling factors may be in play based on which processes need to be performed, which can influence prioritization. A few example of scheduling factors in the finance industry are dollar values, upstream processes, downstream process, the number of items in the business order, and/or the like. Conventionally, bots are scheduled statically to perform these RPA processes, which is sometimes referred to as fixed scheduling.

The present disclosure describes examples of dynamic schedule optimization for bots. In various embodiments, a dynamic schedule optimizer can prioritize bots or processes, for example, based on priority tasks or operations. The dynamic schedule optimizer can receive inputs from a workflow tool, analyze the inputs, and schedule bots via an RPA platform. The principles described herein can enable effective and efficient utilization of shared bot resources such as licenses and virtual machines (VMs) in a dynamic fashion. Further, in various embodiments, the dynamic schedule optimizer can dynamically prioritize upstream and downstream bots and processes based on demand and/or other factors. Examples will be described below relative to the Figures.

For purposes of this application, the term "UI" can include, without limitation, any type of human-machine interface. Example UIs include text-based interfaces such as command-line interfaces, conversational interfaces, crossing-based interfaces, direct manipulation interfaces, gesture interfaces, graphical UIs (GUIs), hardware interfaces, holographic UIs, intelligent UIs, motion tracking interfaces, natural-language interfaces, object-oriented UIs, reflexive UIs, touchscreen interfaces, touch UIs, voice UIs, and web-based UIs. Many of the aforementioned UIs accept input via input devices such as a keyboard, mouse, microphone, combinations of the foregoing, and/or the like. Inputs from any of these devices, in possible combination with specific UI objects or components, can be considered examples of UI events. For illustrative purposes, various examples will be described herein relative to GUIs and UI events that are detected or received in relation to GUIs. It should be appreciated, however, that the principles described herein are applicable to any type of UI, inclusive of the example UIs mentioned previously. A user, unless specifically stated otherwise, or otherwise understood within the context as used, can include any entity, including a human or bot, that can interact with a UI.

FIG. 1 illustrates an example of a system 100 for implementing a central management system 140 for user-executed processes. The system 100 includes the central management system 140, tenant systems 110, RPA platforms 124, user systems 160 and one or more data stores 150, each of which is operable to communicate over a network 108. The network 108 may be, or include, one or more of a private network, a public network, a local or wide area network, a portion of the Internet, combinations of the same, and/or the like.

In some aspects, the central management system 140 can centrally manage bot deployments on the RPA platforms 124 for its tenants. The RPA platforms 124 are shown to include an RPA platform 124(1), an RPA platform 124(2) and an RPA platform 124(N). It should be appreciated that three RPA platforms are shown among the RPA platforms 124 only for illustrative purposes. In various implementations, any number of RPA platforms can be included among the RPA platforms 124. In a typical embodiment, the RPA platforms 124 each provide RPA software for creating and executing bots, generally using different RPA technology, interfaces and formats.

In particular, in the system 100, the tenant systems 110 can be served by the central management system 140. In general, the tenant systems 110 can each be considered an abstraction of users, inclusive of both bots and human workers, that execute user-executed processes managed by the central management system 140, and the systems and data sources with which those users interact. For example, one of the tenant systems 110 is shown as being owned or operated by "Tenant A" while another system 110 is shown as being owned or operated by a different tenant, "Tenant B." The tenant systems 110 shown can be owned or operated by the same or different entities. For example, Tenants A and B can represent customers (e.g., entities such as companies or individuals) of an operator of the central management system 140. Although the term "tenant" is used herein to describe the tenant systems 110 or owners/operators thereof, in addition to having its ordinary meaning, the term "tenant" can, but need not, refer to tenancy in a multitenant software architecture.

The tenant systems 110 are each shown to include one or more managed bots 120, one or more managed human workers 123, one or more computer systems 122 and one or more data sources 121. The one or more computer systems 122 can each provide a computing environment, inclusive of applications and corresponding UIs and dashboards, for executing configurable tasks. As illustrated, any given one of the computer systems 122 may be operated by one of the managed bots 120 or one of the human workers 123. In some cases, the computer systems 122 may represent desktop virtualization environments. In such cases, the human workers 123, for example, may operate the user systems 160 and access the desktop virtualization environments over the network 108.

The one or more data sources 121 of each of the tenant systems 110 can include data streams or datasets that can be received or processed by the computer systems 122, potentially as part of executing the configurable tasks. In various cases, the one or more data sources 121 can be updated by the computer systems 122, or other components, in real-time, on a periodic basis, e.g., according to a schedule, on-demand or a combination of the same. In various cases, the tasks for which the computer systems 122 are configured can be executed in the respective computing environments, for example, manually by the human workers 123 and/or robotically by the managed bots 120. In a typical embodiment, the managed bots 120 are each deployed on an RPA platform of the RPA platforms 124 and interact as users in the computing environments of the computer systems 122 for purposes executing some or all of the configurable tasks as robotic processes.

The managed bots 120 can each include an instruction set 126 that can be used to provide the managed bots 120 a complete set of all computer-implemented tasks or steps that are to be performed in sequence automatically by the managed bots 120, for example, as a user-executed process. In some embodiments, the instruction set 126 is in a machine-readable code that can be recognized and executed by a central processing unit. In various embodiments, the instruction set 126 can be made up of, for example, a markup language, a low-level programming language, a high-level programming language, a scripting language, a machine language, an assembly language or any combination thereof.

As illustrated, the computer systems 122 can include monitoring agents 130. The monitoring agents 130 are software agents that can be used to provide information regarding some or all of the managed bots 120. In certain embodiments, the monitoring agent 130 can be individually triggered, for example, by a human user of one of the user systems 160, to monitor and record user activity in the computing environments provided by the computer systems 122. The user activity can represent, for example, user-executed processes in the computing environments. The user activity can include, for example, UI activity.

In the illustrated embodiment, the central management system 140 can include a dynamic schedule optimizer (DSO) 142, a bot creation module 143, a bot deployment module 144, a bot manager 145, a reporting module 146 and a workflow manager 147. Each of these components can be implemented with hardware and/or software, including (optionally) virtual machines and containers. In an example, the central management system 140 can be implemented as a single management server. In another example, the central management system 140 can be implemented in a plurality of virtual or physical servers, which may or may not be geographically co-located. In some embodiments, the central management system 140 and/or other aspects of the system 100 may be hosted on a cloud-provider system.

In certain embodiments, features of the components of the central management system 140 can be made accessible over an interface to the user systems 160. The user systems 160 can include any type of computing device, including desktops, laptops, tablets, and smartphones, to name a few. The user systems 160 can be operated by users, such as the human workers 123, or by other users, for example, for administration purposes.

The DSO 142 can work with other components of the central management system 140 to dynamically schedule bots. In various embodiments, the DSO 142 can receive input from the workflow manager 147, which is described below, analyzes it, and schedules bots using the RPA platforms 124. An example of the DSO 142 will be described in greater detail relative to FIG. 2.

The bot creation module 143 can be utilized to create bots such as, for example, the managed bots 120. In some embodiments, an instruction set is created via the bot creation module 143 that contains all of the instructions and/or modules for a specific type of bot. The instruction set that is created can be similar to the instruction set 126 of each of the managed bots 120. In certain embodiments, the bot creation module 143 can utilize information from the DSO 142 to automatically create each instruction set. In some embodiments, the bot creation module 143 includes or provides a configuration interface for manual creation of an instruction set, or for revision or tuning of an automatically created instruction set. The configuration interface can be accessible, for example, by the user systems 160.

In certain embodiments, the bot deployment module 144 can be utilized to deploy a bot on the RPA platforms 124 for a tenant, such that the deployed bot becomes one of the managed bots 120. In various embodiments, the bot deployment module 144 can utilize an instruction set created by the bot creation module 143 that can then be deployed. For example, the instruction set 126 of one of the managed bots 120 could be representative of a bot created by the bot creation module 143 and then deployed via the bot deployment module 144. In certain embodiments, the bot deployment module 144 can be used to deploy a single bot and/or a plurality of bots concurrently. In many cases, the bot deployment module 144 can be utilized to deploy bots on a variety of the RPA platforms 124. In some embodiments, the bot deployment module 144 can publish a configuration interface to the user systems 160, for example, for administrators, super users or other users (e.g., of a particular tenant) to select or specify such commands. In other embodiments, the bot deployment module 144 executes an automatic process to deploys bots without manual interaction. In various embodiments, the bot deployment module 144 can store command sets for some or all of the RPA platforms 124.

The bot manager 145 can serve to manage bots such as, for example, the managed bots 120, for tenants. In certain embodiments, the bot manager 145 can issue commands to control operation of bots. The bot manager 145 can be utilized to re-configure, optimize and/or customize any of the managed bots 120. For example, various commands can start or stop bots, perform configuration management, combinations of the same and/or the like. In some cases, the bot manager 145 can publish a configuration interface to the user systems 160, for example, for administrators, super users or other users (e.g., of a particular tenant) to select or specify such commands.

The reporting module 146 can generate regular or on-demand reports related to the managed bots 120 and the managed human workers 123. In various cases, these reports can provide a snapshot of some or all of the managed bots 120 and the managed human workers 123 (e.g., regarding performance gaps as described further below). The reporting module 146 can publish reports or other generated information, for example, to a webpage, user dashboard, and/or the like. The reporting module 146 can generate and execute a query of the one or more data stores 150, as appropriate. The web page, user dashboard or other UI(s) output, for example, by the reporting module 146, can be accessed by certain users of the user systems 160.

In various embodiments, the workflow manager 147 is custom automation software that orchestrates tasks between the managed bots 120 and the managed human workers 123. In some aspects, the workflow manager 147 can interact with administrators, super users or other users to receive and generate orchestration data for a transaction. In various aspects, the transaction data may also be referred to as transaction data, order data, business data, business process data, and the like.

In general, the one or more data stores 150 can include any information collected, stored or used by the central management system 140. For example, in various embodiments, the one or more data stores 150 can include instruction sets for bots, command sets for one or more of the RPA platforms 124, deployment settings for bots (e.g., on a tenant-specific and/or bot-specific basis), metadata for bots to be deployed, orchestration data, priority data, scheduling data, data collected from the managed bots 120, the human workers 123 or the computer systems 122, combinations of the same and/or the like. In certain embodiments, data stored in the one or more data stores 150 can take the form of repositories, flat files, databases, etc. In certain embodiments, the one or more data stores 150 can be utilized as an event library, in which actions performed by any of the managed bots 120 and/or the user systems 160 are stored. The event library can also contain business rule libraries, exception libraries, control libraries, keyboard libraries, database libraries and/or cognitive libraries.

Figure 2:
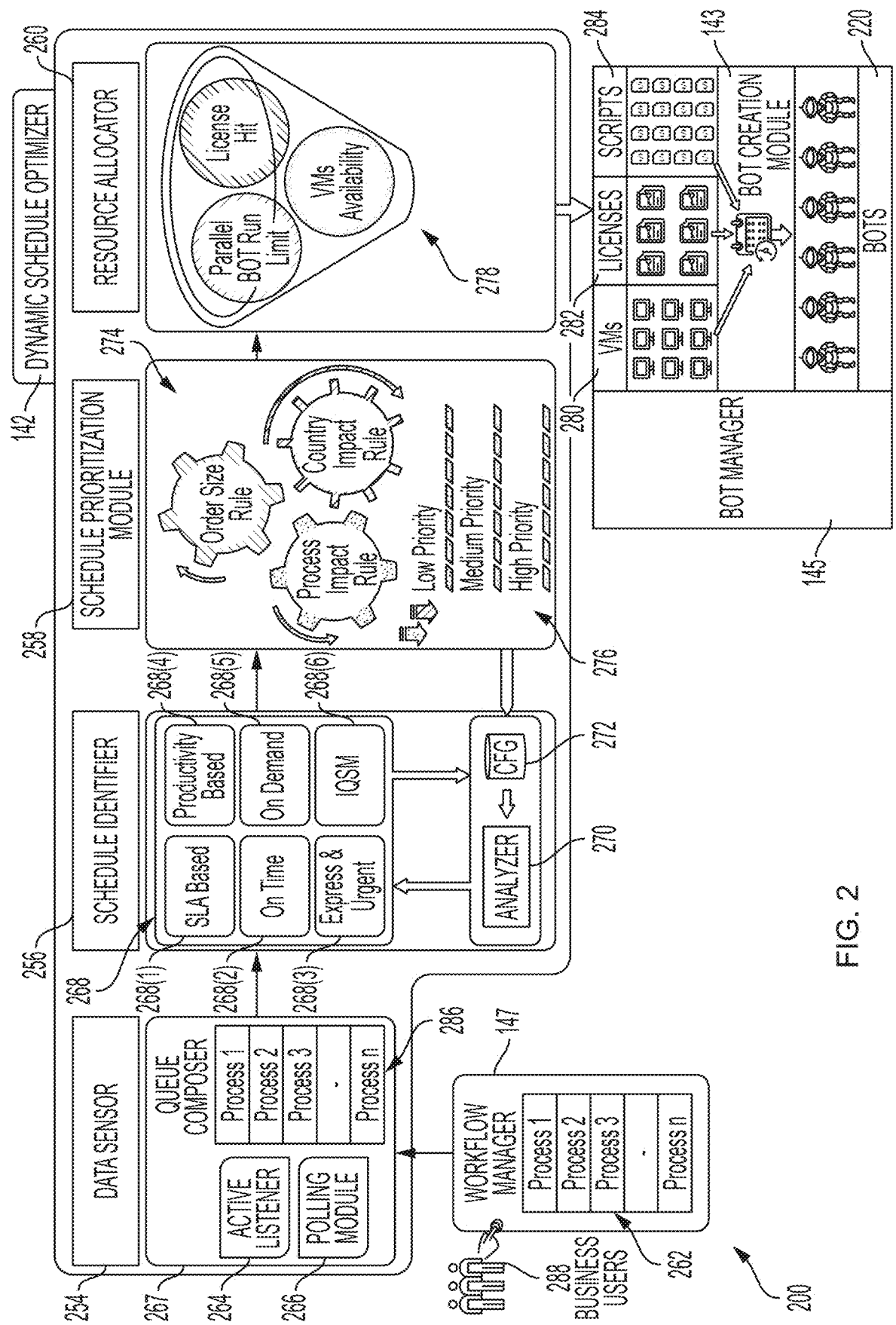
FIG. 2 illustrates an example of a dynamic schedule optimizer.

FIG. 2 illustrates an example of an environment 200 for the DSO 142 of FIG. 1. The DSO 142 includes a data sensor 254, a schedule identifier 256, a schedule prioritization module 258, and a resource allocator 260. As illustrated, the DSO 142 can interact with other components of the system 100 of FIG. 1 such as, for example, the bot creation module 143, the bot manager 145, and the workflow manager 147.

As shown, the workflow manager 147 allows business users 288 to specify or update orchestration data 262 for a transaction that is to be executed robotically, at least in part, via one or more bot runs. In some cases, the orchestration data 262 can amount to an order for processing a transaction. The transaction can be specified, for example, as one or more process sequences that each include one or more stages. Each bot run can map to a bot that, at runtime, is created and deployed to perform at least a portion of a particular user-executed process (e.g., one or more stages of a given process sequence). It should be appreciated, however, that the transaction can be specified at any desired level of granularity.

The orchestration data 262 can include, for example, a hierarchical specification of the transaction, including process sequences and stages, and a granular mapping of specific bot runs to the process sequences and stages. In some embodiments, the orchestration data 262 can include statuses, such as statuses of the transaction, individual process sequences and/or individual stages. Example statuses include, for example, pending, exception and completion.

In various embodiments, the orchestration data 262 can include, for example, urgency settings and/or impact settings. In some embodiments, the urgency settings can be provided by a user and can indicate an urgency value that, in some cases, can be selected from a set of urgency levels. At user direction, the urgency settings can be assigned to individual bot runs or groups of bot runs. Examples of urgency settings include, for example, normal, urgent, and emergency. In some embodiments, the impact settings can involve user selections that affect impact. Examples of impact settings include, for example, a country, a monetary value, and an order size.

In certain embodiments, the orchestration data 262 can include urgency values and impact values that are contained in, or derived from, the urgency settings and impact settings, respectively. For example, in some embodiments, urgency levels of normal, urgent, and emergency could be resolved to urgency values. In an example, urgency levels of normal, urgent, and emergency could be resolved to urgency values of 3, 2, and 1, respectively, to urgency values of 6,000, 4,000 and 2,000, respectively, and/or to other suitable values.

With respect to impact settings, by way of example, each country, monetary value, order size, and/or groups or ranges of the same can each be associated with impact values. Other impact settings can similarly establish other impact values. In this way, a rules-based evaluation of the impact settings can produce various impact values such as, for example, 3, 2, and 1, going from most impactful to least impactful. The values can also be scaled differently, for example, so as to result in impact values such as 900, 700, and 600, and/or the like. Other examples will be apparent to one skilled in the art after a detailed review of the present disclosure. In some cases, the maximum of these impact values can be used for purposes of determining priority values as described in greater detail below.

In general, the data sensor 254 is operable to generate input data 286 for the transaction. The input data 286 for the transaction can include, for example, data that is needed for the transaction to be executed. In various embodiments, the input data 286 can be generated, for example, via receipt from the workflow manager 147, via retrieval from data sources using the orchestration data 262 provided by the workflow manager 147, or via another acquisition or creation method. In the illustrated embodiment, the data sensor 254 includes an active listener 264, a polling module 266, and a queue composer 267.

The active listener 264 can monitor data changes made to the transaction, which changes may be made by user via the workflow manager 147 as described above. The data changes can include, for example, changes to the orchestration data 262. The data changes can include, example, a changed status of the transaction, a changed status of a process sequence within the transaction, a changed status of a stage of a process sequence, etc.

The polling module 266 is configured to identify the data changes by applying, for example, business rules that are pre-defined therein. In some embodiments, the polling module 266 is configured to retrieve, update, and/or create at least a portion of the input data 286. The queue composer 267 can store the input data 286 in a data store such as a database or other memory.

The schedule identifier 256 is operable to generate bot schedules for the bot runs of the transaction based on the input data 286 generated by the data sensor 254. In the illustrated embodiment, the schedule identifier 256 includes preconfigured bot trigger systems 268, an analyzer 270, and business configurations 272. The preconfigured bot trigger systems 268 can include a set of systems that each identify a type of event, threshold, or other criteria for triggering a bot run or sequence of bot runs. In the example of FIG. 2, the preconfigured bot trigger systems 268 include a service level agreement (SLA) based trigger system 268(1), an on-time trigger system 268(2), express-and-urgent trigger systems 268(3), a productivity-based trigger system 268(4), an on-demand trigger system 268(5), and an intelligent queue schedule manager (IQSM) 268(6).

The SLA-based trigger system 268(1) can include one or more systems that trigger a bot run or sequence of bot runs based on one or more thresholds derived from a service level agreement. The on-time trigger system 268(2) can trigger a bot run or sequence of bot runs based on one or more time-based triggers such as, for example, a specified time. The express-and-urgent bot trigger systems 268(3) can designate a bot run or a sequence of bot runs for priority elevation. More particularly, in various embodiments, the express-and-urgent bot trigger system 268(3) can be configurably applied to individual bot runs, individual process sequences, groups of process sequences, the entire transaction and/or the like. For example, an individual bot run can be appointed an "urgent" bot and thereby be designated for priority elevation.

Still referring to the express-and-urgent bot trigger systems 268(3), in another example, all bot runs in a process sequence can be appointed "urgent" bots, where the bot runs are arranged into a chain that execute in sequence with elevated priority until completion of that process sequence. According to this example, the transaction can include other process sequences that are not designated for priority elevation, thus elevating the priority of one process sequence over other process sequences of the transaction. The process sequence which is prioritized may be referred to as an "express" process sequence, thereby indicating that all bot runs within its scope are designated for elevated priority.

Still referring to the express-and-urgent bot trigger systems 268(3), in another example, all bot runs in the transaction can be appointed "urgent" bots, where the bot runs are arranged into a chain that execute in sequence with elevated priority until completion of that transaction. According to this example, the transaction can include multiple process sequences such that all bot runs for all of the process sequences are similarly designated for elevated priority. In this example, the transaction may be referred to as an "express" transaction, thereby indicating that all bot runs within its scope are designated for elevated priority.

The productivity-based trigger system 268(4) can trigger a bot run or sequence of bot runs based on a productivity threshold such as, for example, a requisite number of processed transactions for a tenant. In some embodiments, the productivity threshold can be specified in an SLA. The on-demand trigger system 268(5) can trigger a bot run or sequence of bot runs based on user demand. In various embodiments, the IQSM 268(6) can trigger a bot run or sequence of bot runs based on satisfaction of a resource availability threshold such as, for example, availability of RPA licenses, VM utilization, and/or the like.

The analyzer 270 of the schedule identifier 256 can automatically identify, from among the preconfigured bot trigger systems 268, one or more bot trigger systems for the bot runs of the transaction. In some cases, a single bot trigger system, such as one of the express-and-urgent bot trigger systems 268(3), can be assigned to multiple bot runs or to all bot runs of the transaction as described previously. In other cases, the analyzer 270 can automatically identify a distinct bot trigger system for each bot run. In various embodiments, the analyzer 270 can automatically identify the one or more bot trigger systems based, at least in part, on the business configurations 272. The business configurations 272 can represent for example, varying business needs for different schedules based on any suitable criteria. In various embodiments, the identification of a bot trigger system for a given bot run constitutes a generated bot schedule for that bot run.

The schedule prioritization module 258 can automatically determine priorities 276 for the bot schedules generated by the schedule identifier 256 using, for example, priority rules 274. The priority rules 274 can involve, for example, the business configurations 272, impact values, priority values, and/or other data. In this way, the priorities 276 can be based, at least in part, on the aforementioned data. In the example of FIG. 2, the priorities 276 include low, medium, and high, although other quantities and types of priorities will be apparent to one skilled in the art after a detailed review of the present disclosure. For example, in some embodiments, any bot run associated with elevated priority as described previously can be given the highest priority. In addition, or alternatively, the priorities 276 can be represented as priority values that are computed as a mathematical operation involving the urgency values and the impact values described above. In certain embodiments, for a given bot run, a priority value can equal a difference between the urgency value and the impact value.

In an example scenario, urgency levels can be defined in the urgency settings such that normal, urgent, and emergency correspond to urgency levels of 6,000, 4,000, and 2,000, respectively. Further, it is assumed, for purposes of this example scenario, that the maximum impact value based on the impact settings is 900. According to this example scenario, the priority value can equal 1,100, i.e., the difference between the urgency value for emergency (2,000) and the maximum impact value (900). In some embodiments, the priorities 276 can be represented in a priority queue, where each priority can be categorized as low, medium, or high based on a predefined priority range, such as 1 to 2000 for high priority, 2001 to 4000 for medium priority, and 4001 to 6000 for low priority. According to this example scenario, the priority value of 1,100 can then be categorized as high priority. In the case that more than one transaction is categorized under the same priority level, a FIFO (First in, First Out) approach can be utilized.

The resource allocator 260 can assign shared resources to the bot runs of the transaction according to the bot schedules generated by the schedule identifier 256 and the priorities 276 determined by the schedule prioritization module 258. In a typical embodiment, the assignment of shared resources is at least partly based on resource availability and a comparison of the priority values relative to priority values for other bot schedules for other transactions. In a typical embodiment, the resource allocator 260, as part of its functionality, evaluates resource constraints 278 relative to the shared resources. The resource constraints 278 can include, for example, a parallel bot-run limit, an RPA license hit, VM availability, and/or other constraints.

In the illustrated embodiment, the resource allocator 260 can assign resources, as they become available, according to the priorities 276 and other priorities of other bot schedules. More particularly, the assignment of shared resources for the transaction can involve allocating and utilizing VMs 280, RPA licenses 282, scripts 284, and/or other resources. In various embodiments, the resource allocator 260 can communicate with the bot manager 145, the bot creation module 143 and/or other components to allocate bots 220 corresponding to the bot runs of the transaction. In some cases, the resource allocator 260 can interact with the bot manager 145, the bot creation module 143 and/or other components to create and/or deploy the bots 220. In some embodiments, at least a portion of the bots 220 may be bots that have already been created and/or deployed, such that the resource allocator 260 can issue one or jobs to such bots.

In various embodiments, the resource allocator 260 ensures that runtime resources are not assigned for other bot schedules until present bot schedules are completed. The resource allocator 260 can monitor bot schedule status, for example, using the bot manager 145. The resource allocator 260 can send a notification to a configurable user or group of users, for example, responsive to a determination that the transaction has been completed. In this way, shared resources can be utilized throughout the day without being in idle state.

Figure 3A:
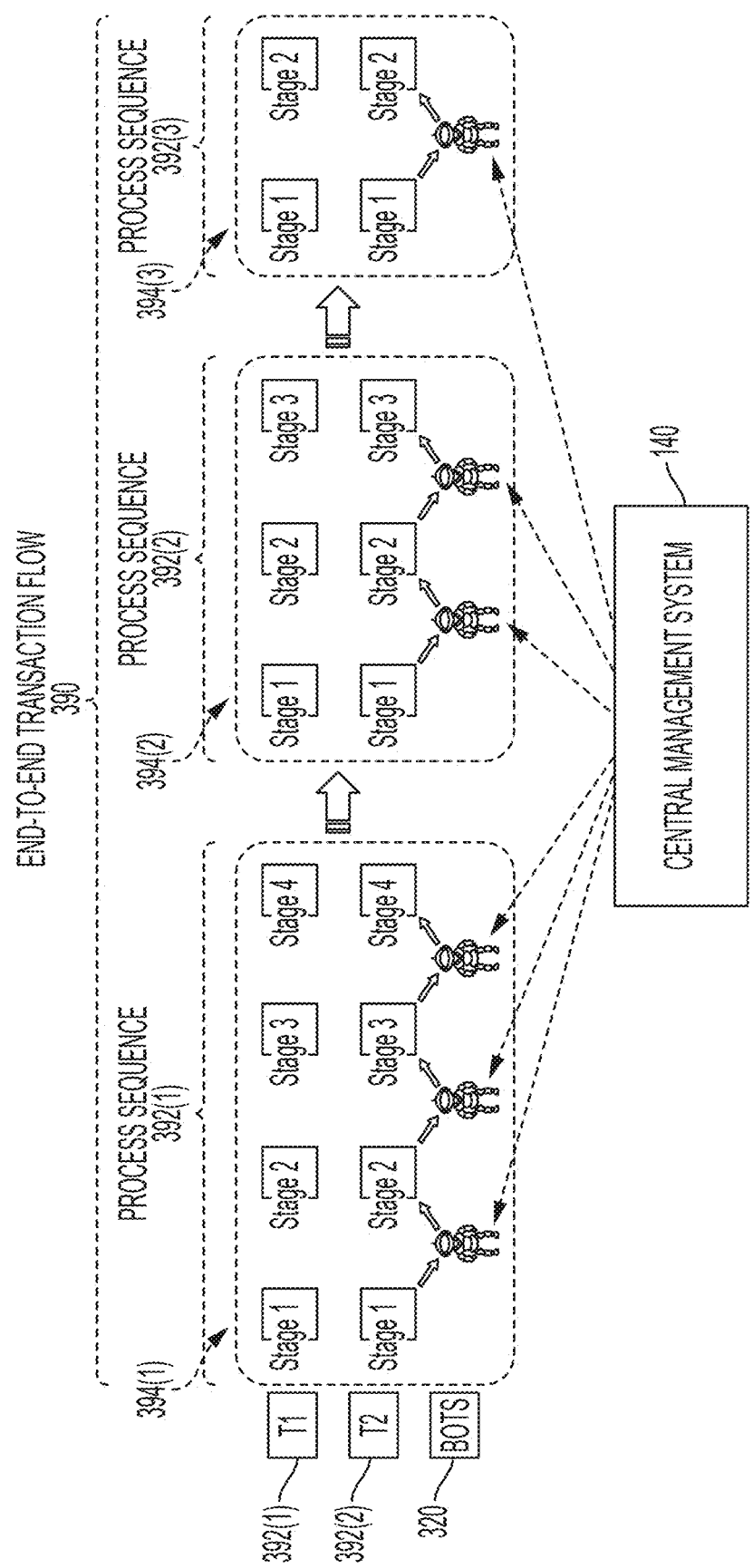
FIG. 3A illustrates an example of an end-to-end transaction flow.

FIG. 3A illustrates an example of an end-to-end (E2E) transaction flow 390. The E2E transaction flow 390 includes three process sequences, namely, a first process sequence 392(1), a second process sequence 392(2), and a third process sequence 392(3). The process sequences 392(1), 392(2), and 392(3) include process stages 394(1), 394(2), and 394(3), respectively.

Two example transactions are shown in FIG. 3A, namely, a transaction T1 392(1) and transaction T2 392(2), with each transaction having the same E2E transaction flow 390. In the illustrated embodiment, the central management system 140 allocates bots 320 with respect to the transaction T2 392(2), where each of the bots 320 performs one or more stages of one or more process sequences as indicated. In the illustration of FIG. 3A, the transaction T2 392(2) may be considered an example of an express transaction as described previously.

Figure 3B:
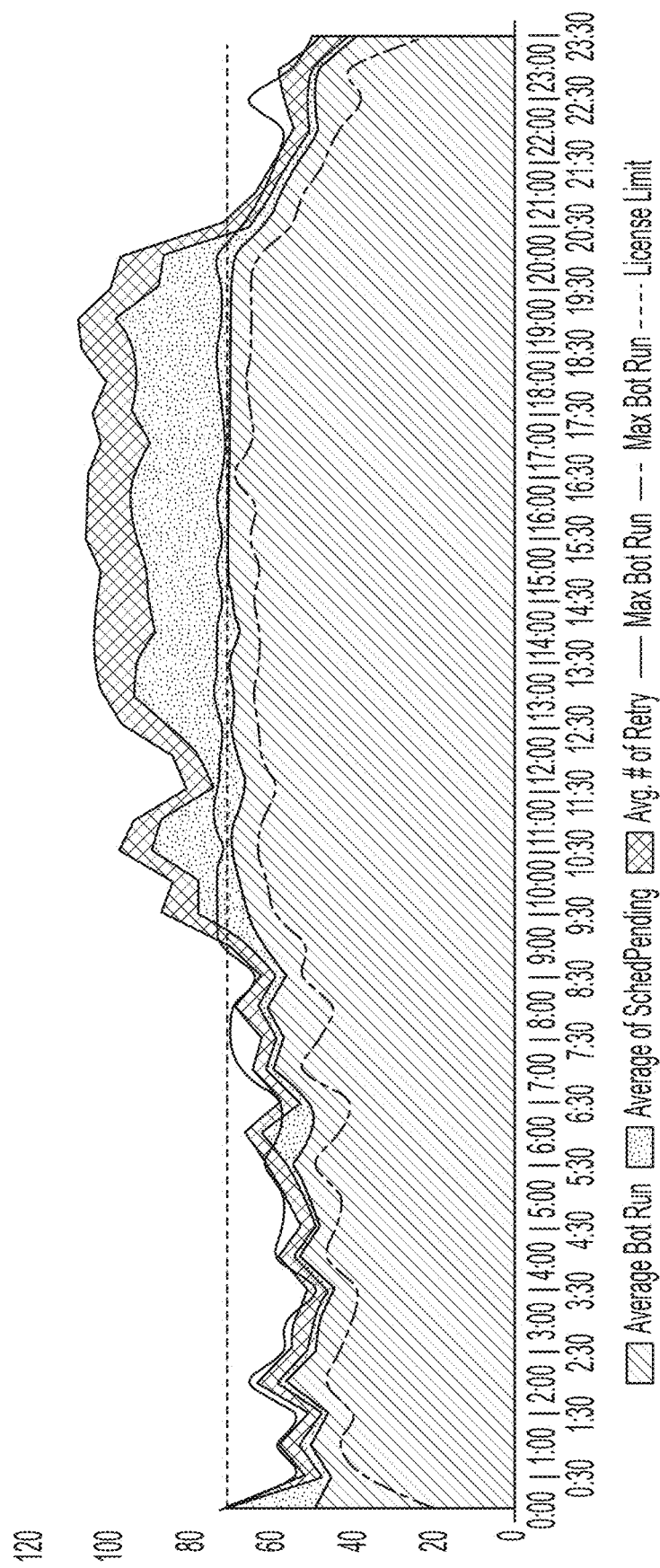
FIG. 3B illustrates performance of example bot schedules.

FIG. 3B is a graph that illustrates example performance of example bot schedules.

Figure 4:
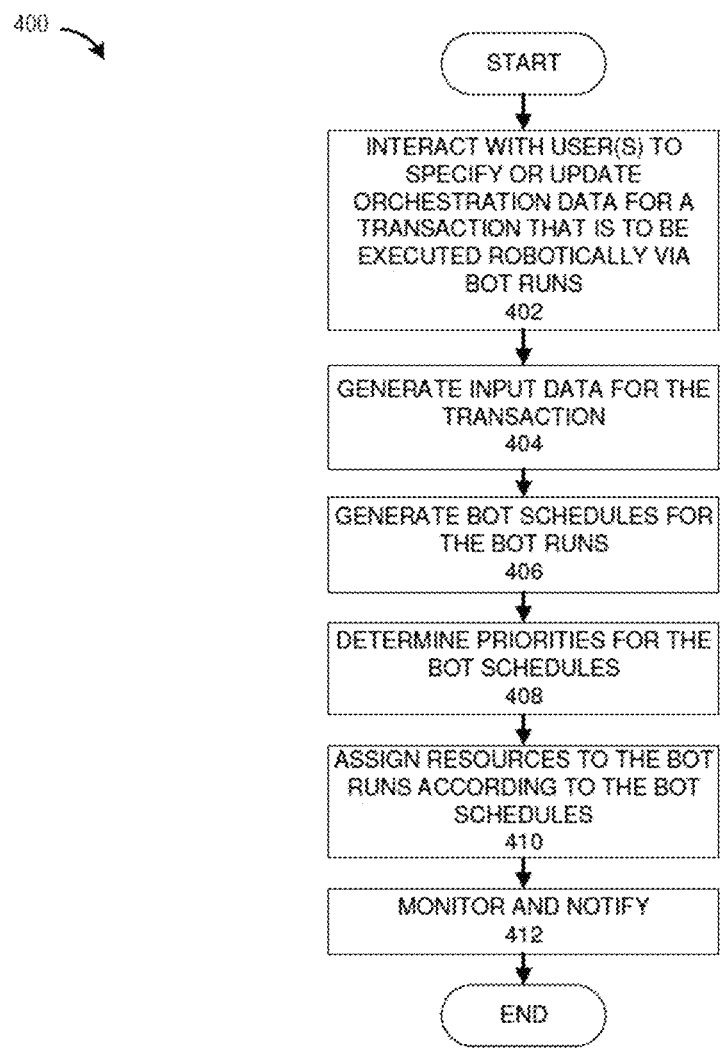
FIG. 4 illustrates an example of a process for dynamically optimizing bot schedules.

FIG. 4 illustrates an example of a process 400 for dynamically optimizing bot schedules. For illustrative purposes, the process 400 will be described relative to a single transaction. It should be appreciated, however, that each block of the process 400 can be performed in parallel with respect to a multitude of transactions. In certain embodiments, the process 400 can be implemented by any system that can process data. Although any number of systems, in whole or in part, can implement the process 400, to simplify discussion, the process 400 will be described in relation to particular components shown and described relative to FIGS. 1-2.

At block 402, the workflow manager 147 interacts with one or more users, such as the business users 288, to specify or update orchestration data for a transaction that is to be executed robotically, at least in part, via a plurality of bot runs. At block 404, the data sensor 254 generates input data for the transaction, such as the input data 286 described previously. At block 406, the schedule identifier 256 receives the input data and automatically generates a plurality of bot schedules for the plurality of bot runs.

At block 408, the schedule prioritization module 258 automatically determines priorities for the plurality of bot schedules based, at least in part, on the input data and business configurations such as the business configurations 272. At block 410, the resource allocator 260 assigns shared resources to the plurality of bot runs according to the plurality of bot schedules. In a typical embodiment, the shared-resource assignments are at least partly based on resource availability and how the automatically determined priorities compare to priority values for other bot schedules for other transactions.

At block 412, the resource allocator 260 monitors execution of the transaction and notifies a user or group of users in response to a determination that certain transaction benchmarks have been achieved. For example, the resource allocator 260 can notify a user or group of users that the transaction has been completed. After block 412, the process 400 ends.

Figure 5:
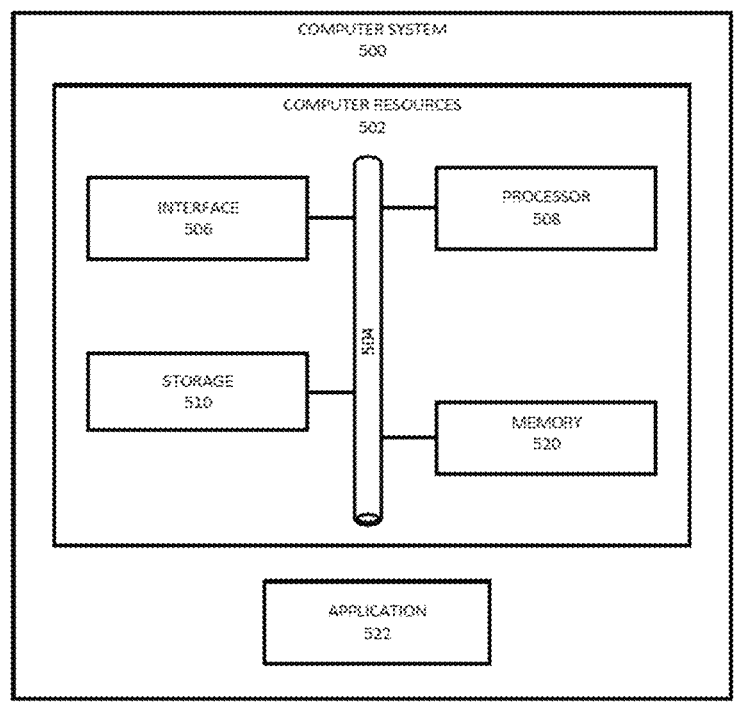
FIG. 5 illustrates an example of a computer system.

FIG. 5 illustrates an example of a computer system 500 that, in some cases, can be representative, for example, of the central management system 140, the RPA platforms 124, the tenant systems 110, the user systems 160 and/or a module or sub-component of the foregoing. The computer system 500 includes an application 522 operable to execute on computer resources 502. The application 522 can be, for example, any of the systems or modules illustrated in FIG. 1 or FIG. 2. In particular embodiments, the computer system 500 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the computer system 500 may comprise any suitable physical form, configuration, number, type and/or layout. As an example, and not by way of limitation, the computer system 500 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 500 may include one or more computer systems; be unitary or distributed; span multiple locations; span multiple machines; or reside in a cloud, which may include one or more cloud components in one or more networks.

In the depicted embodiment, the computer system 500 includes a processor 508, memory 520, storage 510, interface 506, and bus 504. Although a particular computer system is depicted having a particular number of particular components in a particular arrangement, this disclosure contemplates any suitable computer system having any suitable number of any suitable components in any suitable arrangement.

Processor 508 may be a microprocessor, controller, or any other suitable computing device, resource, or combination of hardware, software and/or encoded logic operable to execute, either alone or in conjunction with other components, (e.g., memory 520), the application 522. Such functionality may include providing various features discussed herein. In particular embodiments, processor 508 may include hardware for executing instructions, such as those making up the application 522. As an example, and not by way of limitation, to execute instructions, processor 508 may retrieve (or fetch) instructions from an internal register, an internal cache, memory 520, or storage 510; decode and execute them, and then write one or more results to an internal register, an internal cache, memory 520, or storage 510.

In particular embodiments, processor 508 may include one or more internal caches for data, instructions, or addresses. This disclosure contemplates processor 508 including any suitable number of any suitable internal caches, where appropriate. As an example, and not by way of limitation, processor 508 may include one or more instruction caches, one or more data caches, and one or more translation lookaside buffers (TLBs). Instructions in the instruction caches may be copies of instructions in memory 520 or storage 510 and the instruction caches may speed up retrieval of those instructions by processor 508. Data in the data caches may be copies of data in memory 520 or storage 510 for instructions executing at processor 508 to operate on; the results of previous instructions executed at processor 508 for access by subsequent instructions executing at processor 508, or for writing to memory 520, or storage 510; or other suitable data. The data caches may speed up read or write operations by processor 508. The TLBs may speed up virtual-address translations for processor 508. In particular embodiments, processor 508 may include one or more internal registers for data, instructions, or addresses. Depending on the embodiment, processor 508 may include any suitable number of any suitable internal registers, where appropriate. Where appropriate, processor 508 may include one or more arithmetic logic units (ALUs); be a multi-core processor; include one or more processors 508; or any other suitable processor.

Memory 520 may be any form of volatile or non-volatile memory including, without limitation, magnetic media, optical media, random access memory (RAM), read-only memory (ROM), flash memory, removable media, or any other suitable local or remote memory component or components. In particular embodiments, memory 520 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 520 may include one or more memories 520, where appropriate. Memory 520 may store any suitable data or information utilized by the computer system 500, including software embedded in a computer readable medium, and/or encoded logic incorporated in hardware or otherwise stored (e.g., firmware). In particular embodiments, memory 520 may include main memory for storing instructions for processor 508 to execute or data for processor 508 to operate on. In particular embodiments, one or more memory management units (MMUs) may reside between processor 508 and memory 520 and facilitate accesses to memory 520 requested by processor 508.

As an example, and not by way of limitation, the computer system 500 may load instructions from storage 510 or another source (such as, for example, another computer system) to memory 520. Processor 508 may then load the instructions from memory 520 to an internal register or internal cache. To execute the instructions, processor 508 may retrieve the instructions from the internal register or internal cache and decode them. During or after execution of the instructions, processor 508 may write one or more results (which may be intermediate or final results) to the internal register or internal cache. Processor 508 may then write one or more of those results to memory 520. In particular embodiments, processor 508 may execute only instructions in one or more internal registers or internal caches or in memory 520 (as opposed to storage 510 or elsewhere) and may operate only on data in one or more internal registers or internal caches or in memory 520 (as opposed to storage 510 or elsewhere).

In particular embodiments, storage 510 may include mass storage for data or instructions. As an example, and not by way of limitation, storage 510 may include a hard disk drive (HDD), a floppy disk drive, flash memory, an optical disc, a magneto-optical disc, magnetic tape, or a Universal Serial Bus (USB) drive or a combination of two or more of these. Storage 510 may include removable or non-removable (or fixed) media, where appropriate. Storage 510 may be internal or external to the computer system 500, where appropriate. In particular embodiments, storage 510 may be non-volatile, solid-state memory. In particular embodiments, storage 510 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 510 may take any suitable physical form and may comprise any suitable number or type of storage. Storage 510 may include one or more storage control units facilitating communication between processor 508 and storage 510, where appropriate.

In particular embodiments, interface 506 may include hardware, encoded software, or both providing one or more interfaces for communication (such as, for example, packet-based communication) among any networks, any network devices, and/or any other computer systems. As an example, and not by way of limitation, communication interface 506 may include a network interface controller (NIC) or network adapter for communicating with an Ethernet or other wire-based network and/or a wireless NIC (WNIC) or wireless adapter for communicating with a wireless network.

Depending on the embodiment, interface 506 may be any type of interface suitable for any type of network for which computer system 500 is used. As an example, and not by way of limitation, computer system 500 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 can include (or communicate with) a wireless PAN (WPAN) (such as, for example, a BLU-ETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 500 may include any suitable interface 506 for any one or more of these networks, where appropriate.

In some embodiments, interface 506 may include one or more interfaces for one or more I/O devices. One or more of these I/O devices may enable communication between a person and the computer system 500. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 506 for them. Where appropriate, interface 506 may include one or more drivers enabling processor 508 to drive one or more of these I/O devices. Interface 506 may include one or more interfaces 506, where appropriate.

Bus 504 may include any combination of hardware, software embedded in a computer readable medium, and/or encoded logic incorporated in hardware or otherwise stored (e.g., firmware) to couple components of the computer system 500 to each other. As an example, and not by way of limitation, bus 504 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 504 may include any number, type, and/or configuration of buses 504, where appropriate. In particular embodiments, one or more buses 504 (which may each include an address bus and a data bus) may couple processor 508 to memory 520. Bus 504 may include one or more memory buses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 508 (such as, for example, one or more internal registers or caches), one or more portions of memory 520, one or more portions of storage 510, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments, are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising:
   receiving input data needed for a transaction to be executed, wherein a plurality of respective bot schedules for a plurality of bot runs is based at least in part on the input data, and wherein respective priorities for the plurality of bot schedules are based at least in part on the input data and different business configurations for the plurality of bot schedules;
   creating one or more bots;
   deploying the one or more bots on one or more robotic process automation (RPA) platforms, wherein resources of the one or more RPA platforms are shared by the plurality of bot schedules for executing the transaction and a plurality of other bot schedules for executing other transactions; and
   executing the transaction by executing the plurality of bot runs using the one or more created bots and the shared resources of the one or more RPA platforms according to respective availabilities of the shared resources and values of the respective priorities for the plurality of bot schedules relative to values of respective priorities for the plurality of other bot schedules.

2. The method of claim 1, wherein at least one bot trigger system of a plurality of preconfigured bot trigger systems for the plurality of bot runs is at least partly based on the input data and the different business configurations.

3. The method of claim 2, wherein executing the transaction comprises executing a first process sequence and a second process sequence of the transaction.

4. The method of claim 3, wherein the at least one bot trigger system comprises a first bot trigger system for a first bot run and a second bot trigger system for a second bot run of the plurality of bot runs.

5. The method of claim 4, wherein the first bot trigger system comprises an arrangement of the first bot run and the second bot run into a chain that executes in sequence with elevated priority until completion of the first process sequence and the second process sequence.

6. The method of claim 3, wherein the at least one bot trigger system comprises an arrangement of a first bot run and a second bot run into a chain that executes in sequence with elevated priority until completion of the transaction.

7. The method of claim 2, wherein the at least one bot trigger system relates to bot triggering based on satisfaction of a resource availability threshold for the shared resources.

8. The method of claim 7, wherein the resource availability threshold relates to availability of RPA licenses of the one or more RPA platforms.

9. The method of claim 7, wherein the resource availability threshold relates to virtual machine utilization of the one or more RPA platforms.

10. The method of claim 2, wherein the at least one bot trigger system relates to bot triggering based on a productivity threshold of the one or more RPA platforms.

11. The method of claim 2, wherein the at least one bot trigger system relates to bot triggering based on one or more thresholds derived from a service level agreement of the one or more RPA platforms.

12. The method of claim 2, wherein the at least one bot trigger system relates to bot triggering based on user demand of the one or more RPA platforms.

13. The method of claim 2, wherein the at least one bot trigger system relates to bot triggering based on a specified time.

14. The method of claim 1, wherein:
the respective priorities are based on one or more priority rules that are based, at least in part, on impact values associated with the plurality of bot runs; and
the impact values each comprise information derived from at least one of a country, a monetary value, and an order size.

15. The method of claim 1, wherein the respective priorities are based on one or more priority rules that are based, at least in part, on urgency values associated with the plurality of bot runs.

16. The method of claim 1, wherein the respective priorities are based on one or more priority rules that are based, at least in part, on a combination of urgency values and impact values, wherein the urgency values and the impact values are associated with the plurality of bot runs.

17. The method of claim 1, comprising:
notifying a user when the transaction has been completed.

18. The method of claim 1, wherein the input data is received from a workflow manager or a data sensor of the one or more RPA platforms.

19. A computer system comprising a processor and memory, wherein the processor and the memory in combination are operable to execute a method comprising:
receiving input data needed for a transaction to be executed, wherein a plurality of respective bot schedules for a plurality of bot runs is based at least in part on the input data, and wherein respective priorities for the plurality of bot schedules are based at least in part on the input data and different business configurations for the plurality of bot schedules;
creating one or more bots;
deploying the one or more bots on one or more robotic process automation (RPA) platforms, wherein resources of the one or more RPA platforms are shared by the plurality of bot schedules for executing the transaction and a plurality of other bot schedules for executing other transactions; and
executing the transaction by executing the plurality of bot runs using the one or more created bots and the shared resources of the one or more RPA platforms according to respective availabilities of the shared resources and values of the respective priorities for the plurality of bot schedules relative to values of respective priorities for the plurality of other bot schedules.

20. A computer-program product comprising a non-transitory computer-usable medium having computer-readable program code embodied therein, the computer-readable program code adapted to execute a method comprising:
receiving input data needed for a transaction to be executed, wherein a plurality of respective bot schedules for a plurality of bot runs is based at least in part on the input data, and wherein respective priorities for the plurality of bot schedules are based at least in part on the input data and different business configurations for the plurality of bot schedules;
creating one or more bots;
deploying the one or more bots on one or more robotic process automation (RPA) platforms, wherein resources of the one or more RPA platforms are shared by the plurality of bot schedules for executing the transaction and a plurality of other bot schedules for executing other transactions; and
executing the transaction by executing the plurality of bot runs using the one or more created bots and the shared resources of the one or more RPA platforms according to respective availabilities of the shared resources and values of the respective priorities for the plurality of bot schedules relative to values of respective priorities for the plurality of other bot schedules.

* * * * *